US006988122B2

(12) United States Patent     (10) Patent No.: US 6,988,122 B2
Cole     (45) Date of Patent: Jan. 17, 2006

(54) FERRIS-WHEEL QUEUE

(75) Inventor: John W. Cole, Aliso Viejo, CA (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 09/756,939

(22) Filed: Jan. 9, 2001

(65) Prior Publication Data

US 2002/0091719 A1 Jul. 11, 2002

(51) Int. Cl.
    *G06F 15/16*     (2006.01)
    *G06F 15/167*     (2006.01)
    *G06F 3/00*     (2006.01)
    *H04L 12/50*     (2006.01)

(52) U.S. Cl. .................. 709/200; 709/203; 709/213; 709/217; 709/219; 370/412; 710/52; 710/53; 710/54; 710/55; 710/56; 710/57

(58) Field of Classification Search ................ 709/200, 709/203, 213, 217, 219, 314, 234; 370/412; 710/52–57
See application file for complete search history.

(56) References Cited

U.S. PATENT DOCUMENTS

| | | | | |
|---|---|---|---|---|
| 4,658,359 | A | * | 4/1987 | Palatucci et al. ............. 701/14 |
| 5,142,624 | A | * | 8/1992 | Patrick, II .................... 709/226 |
| 5,276,896 | A | | 1/1994 | Rimmer et al. |
| 5,533,020 | A | | 7/1996 | Byrn et al. |
| 5,844,890 | A | | 12/1998 | Delp et al. |
| 5,878,228 | A | | 3/1999 | Miller et al. |
| 5,910,178 | A | | 6/1999 | Moh et al. |
| 5,916,307 | A | | 6/1999 | Piskiel et al. |
| 5,982,776 | A | | 11/1999 | Manning et al. |
| 6,298,386 | B1 | * | 10/2001 | Vahalia et al. ............... 709/234 |
| 6,614,441 | B1 | * | 9/2003 | Jiang et al. .................. 345/539 |
| 6,618,390 | B1 | * | 9/2003 | Erimli et al. ................ 370/412 |
| 6,714,959 | B1 | * | 3/2004 | Dangi et al. .................. 710/54 |

OTHER PUBLICATIONS

IBM, Queueing Mechanism for Bi–Processor Communication, May 1997, vol. 40, No. 05, pg's 169–171.*
IBM Technical Disclosure Bulletin "Queueing Mechanism for Bi–Processor Communication" vol. 40, No. 05, May 1997, pp. 169–171.*

* cited by examiner

*Primary Examiner*—Zarni Maung
*Assistant Examiner*—Hassan Phillips
(74) *Attorney, Agent, or Firm*—DeLio & Peterson, LLC; Robert Curcio, Esq.; Jay H. Anderson, Esq.

(57) ABSTRACT

The present invention provides a method of transferring incoming multithreaded concurrent sets of data from a sending transport system to a requesting transport system which includes retrieving the sets of data from the sending transport system. A receiving queue is queried for a number of available data storage locations, and the sets of data being transferred to the receiving queue. The method further includes queuing the sets of data in the receiving queue, where each the set of data are divided into blocks of data. Then, determining a number of the data storage locations for storing the blocks of data. Next, the blocks of data are loaded into available data storage locations, and location indexes are provided for each of the blocks of data where the location indexes associate the block of data with a corresponding the storage location. The method then includes sending the sets of data to the requesting transport system by transmitting associated data in the storage locations, and indicating the storage location is available for storing other the blocks of data.

20 Claims, 4 Drawing Sheets

FERRIS-WHEEL QUEUE

BACKGROUND OF THE INVENTION

1. Field of the Invention

This invention generally relates to a message processing system in a data system environment and, in particular, to a point-to-point data messaging system including a data queuing method.

2. Description of Related Art

Data messaging systems between computers and computer networks typically infer the use of multiple queues to support their required data buffering. Further, some methods used in balanced queue communication systems between nodes in a distributed computing environment have been disclosed as also using multiple queuing configurations. Multiple queues tend to use a substantial amount of system overhead, especially in the amount of memory usage for both redundant queue support code, as well as, buffer space.

The prior art discloses methods directed towards how the data of a single process is distributed and received on a multipoint-to-point network system where other nodes may also transmit data onto the network. However, these references do not disclose data being generated by multiple processes operating on a single node. Further, the prior art references do not disclose a method for ensuring that the data generated internally by multiple processes, is uncorrupted before being transmitted onto the network. Typical multipoint-to-point networks enable messaging, however, they are deficient in ensuring or reducing the likelihood of multi-processes corrupting data within any single node prior to that data being sent onto the network.

Other prior art references are substantially directed towards various rates of data sources on asynchronous networks (ATM), and how the data cells may be transmitted and reliably reassembled by the receivers, yet do not disclose the possibility of data corruption of the data prior to or during the development of the data cells, as a result of multiple processes.

Further, typical prior art references do not disclose a method of reconfiguring distributed queue systems. As requirements change, reconfiguring the size and functionality of a queue may optimize the system. If a distributed queue system is part of a balanced queue system, then every node in the network must be reconfigured each time any node requires a larger database. In general, every node is effected by changes in any other node in a distributed queue system. If a system is not properly optimized by reconfiguration, then system resources may be wasted.

Bearing in mind the problems and deficiencies of the prior art, it is therefore an object of the present invention to provide a messaging systems which uses a single queue.

It is another object of the present invention to provide a queue that will solve the problem of storing internally generated data from multiple internal sources.

It is yet another object of the present invention to provide a method for data to be generated by multiple processes while operating on a single node.

It is still another object of the present invention to provide data transmission onto a data link independent of transfer rate and mode.

It is a further object of the present invention to provide a messaging system which is fully configurable to optimize memory usage.

It is another object of the invention to provide a messaging system that will transmit data onto a single data link while substantially ensuring non-corruption of the transmitted data.

It is yet another object of the present invention to provide a methods to ensure that internally generated data is not being corrupted before being transmitted onto the network.

It is still another object of the present invention to provide a readily configurable queue for optimal buffer memory space usage.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of transferring incoming multithreaded concurrent sets of data from a sending transport system to a requesting transport system which includes retrieving the sets of data, querying a receiving queue for available data storage locations, and transferring the sets of data to a receiving queue. The method then includes queuing the sets of data in the receiving queue by dividing the sets of data into blocks of data, storing the blocks of data in the available data storage locations, and having associated data by using location indexes to associate the blocks of data with the corresponding storage location. The method next includes sending the sets of data by transmitting the associated data in the storage locations to the requesting transport system, and indicating the storage location is available for storing other the blocks of data.

In a related aspect, the present invention provides transmitting the data in a point-to-point transmission.

In another related aspect, the present invention provides transmitting data synchronously.

In yet another related aspect, the present invention provides transmitting data asynchronously.

In another aspect, the present invention provides a method of transferring incoming multithreaded concurrent sets of data from a sending transport system to a requesting transport system which includes retrieving the sets of data from the sending transport system, a receiving queue being queried for a number of available data storage locations, and the sets of data being transferred to the receiving queue. The method further includes queuing the sets of data in the receiving queue, each the set of data being divided into blocks of data, determining a number of the data storage locations for storing the blocks of data, the blocks of data being loaded into available the data storage locations, and providing location indexes for each of the blocks of data where the location indexes associate the block of data with a corresponding the storage location. The method then includes sending the sets of data to the requesting transport system by transmitting associated data in the storage locations, and indicating the storage location is available for storing other the blocks of data. In a related aspect, the present invention provides data being transmitted which is sent as a single message.

In a related aspect, the present invention provides data being transmitted as a point-to-point transmission.

In yet another related aspect, the present invention provides data being transmitted synchronously.

In another related aspect, the present invention provides data being transmitted asynchronously.

In still another related aspect, the present invention provides the steps of calculating a required number of the data storage locations for the sets of data.

In another related aspect, the present invention provides the steps of determining if the receiving queue has available the required number of the data storage locations; and signaling the retrieving process to transfer the sets of data to the receiving queue.

In yet another related aspect, the present invention provides indicating to the requesting transport system that the sets of data are ready for sending.

In still another aspect, the present invention provides a method of transferring incoming multithreaded concurrent sets of data in a point-to-point either synchronous or asynchronous transmission from a sending transport system to a requesting transport system providing a retrieving process for retrieving the sets of data from the sending transport system and retrieving the sets of data from the sending transport system. The method further calculating a required number of the data storage locations for the sets of data. Then, the receiving queue being queried for a number of available data storage locations, and determining if a receiving queue has available the required number of data storage locations. Next, signaling the retrieving process to transfer the sets of data to the receiving queue and the sets of data being transferred to a receiving queue. The method then includes queuing the sets of data in the receiving queue, where each of the sets of data being divided into blocks of data, determining a number of the data storage locations for storing the blocks of data, the blocks of data being loaded into the available data storage locations. The method includes providing location indexes for each of the blocks of data where the location indexes associate the block of data with a corresponding the storage location. Then, providing a sending process for sending the sets of data to the requesting transport system and indicating to the requesting transport system that the sets of data are ready for sending. The method then includes transmitting associated data in the storage locations wherein the data being transmitted is sent as a single message, and indicating the storage location is available for storing other blocks of data.

In still another aspect, the present invention provides a computer program product for transferring incoming multithreaded concurrent sets of data from a sending transport system to a requesting transport system. The computer program includes computer readable program code means for retrieving the sets of data, and querying a receiving queue for available data storage locations by transferring the sets of data to a receiving queue. The program includes computer readable program code means for queuing the sets of data in the receiving queue by dividing the sets of data into blocks of data, storing the blocks of data in the available data storage locations, having associated data by using location indexes to associate the blocks of data with the corresponding storage location. The computer program further includes computer readable program code means for sending the sets of data by transmitting the associated data in the storage locations to the requesting transport system, and indicating the storage location is available for storing other blocks of data.

In another aspect, the present invention provides a program storage device readable by a machine, tangibly embodying a program of instructions executable by the machine to perform method steps for transferring incoming multithreaded concurrent sets of data from a sending transport system to a requesting transport system. The program storage device includes retrieving the sets of data, and querying a receiving queue for available data storage locations by transferring the sets of data to a receiving queue. The device includes queuing the sets of data in the receiving queue by dividing the sets of data into blocks of data, storing the blocks of data in the available data storage locations, having associated data by using location indexes to associate the blocks of data with the corresponding storage location. The device further includes sending the sets of data by transmitting the associated data in the storage locations to the requesting transport system, and indicating the storage location is available for storing other the blocks of data.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS(S)

Figure 1:
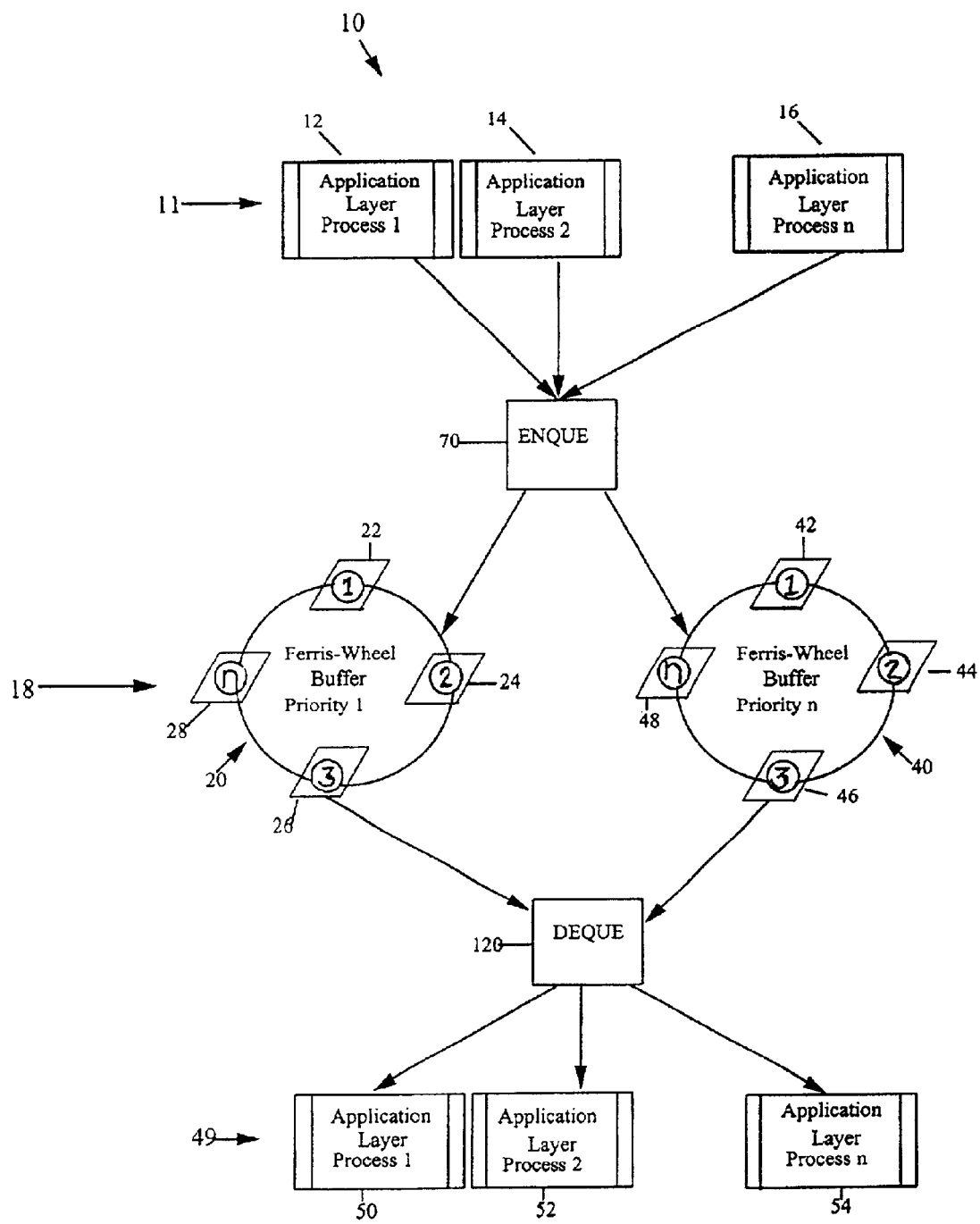
FIG. 1 is a flow chart depicting the method steps of a preferred embodiment of the present invention.

In describing the preferred embodiment of the present invention, reference will be made herein to FIGS. 1–3 of the drawings in which like numerals refer to like features of the invention. Features of the invention are not necessarily shown to scale in the drawings.

The present invention as discloses herein has advantages over previous methods disclosed in the prior art and discussed above. The preferred embodiment of the present invention substantially ensures that data sent from several internal processes remains uncorrupted prior to being sent onto the network. After the data is sent onto a point-to-point network as described in the present invention, the data preferably remains uncorrupted since the receiving node is the other point in the network.

A preferred embodiment of the present invention disclosed herein, solves the problems and shortcomings described above, using a "Ferris-Wheel Queue" disclosed herein. The "Ferris-Wheel Queue" is an abstract data structure which solves the problem of storing internally generated data from various internal sources, and also solves the problem of transmitting data onto a single data link as an uncorrupted group of data. Further, the "Ferris-Wheel Queue" data structure solution may use either synchronous or asynchronous communication between data links while providing a single queue solution for transmitting data from multiple data sources.

The present invention discloses a single queue approach for receiving multithreaded concurrent sets of data. The advantage of using the single queue method disclosed in the present invention includes the elimination of multiple queues, while concurrently buffering data from multiple processes. Also, the Ferris-Wheel Queue embodiment of the present invention ensures that concurrent processes on the transmitting node do not corrupt the data which is being sent on a point-to-point network, where the need for multiple queues has been eliminated. Moreover, the present invention provides protection of the integrity of the data from multiple concurrent processes within a single queue solution. Another advantage of the present invention is the scalability of the single queue, which permits configurability for optimal buffer memory space usage.

A preferred embodiment of the present invention is a "Ferris-Wheel Queue" data structure. The "Ferris-Wheel Queue" data structure is a single access point for the transmission of data on an external point-to-point transmission medium, whose data comes from multiple sources. The "Ferris-Wheel Queue" data structure supports the buffering of data generated by multiple processes being executed in a single multiprocessing system. The multiple processes may each access this queue in an interleaving fashion, without the data being combined with data of other processes. Thus, the single queue approach eliminates the need for multiple queues. A system having multiple queues would require one or more queues for each process in the system thereby needing buffered data, as well as, the need for supporting the functional overhead for each process buffer.

Figure 2:
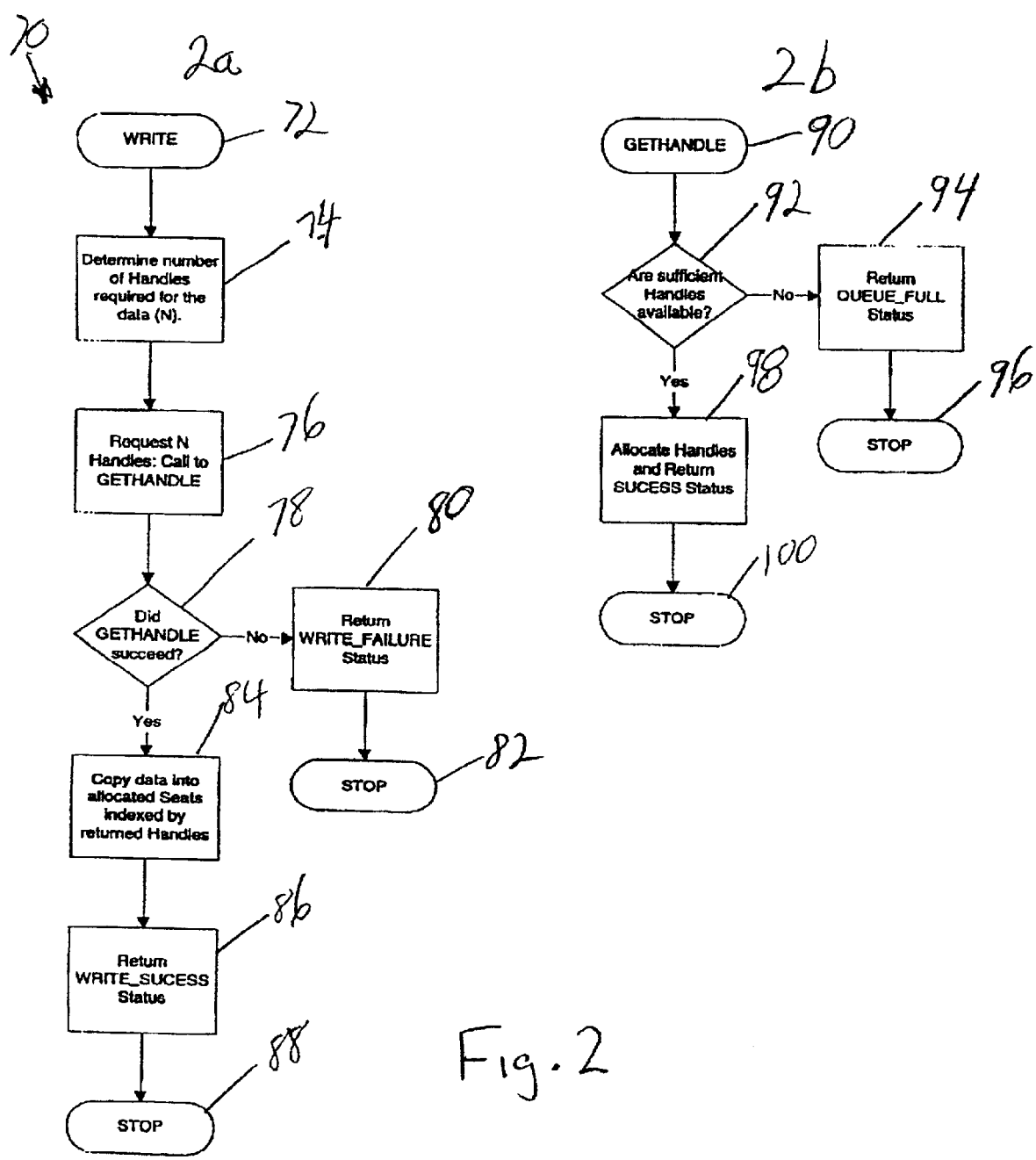
FIG. 2 is a flow chart depicting the method steps of the enque process of the preferred embodiment of the present invention shown in FIG. 1.
Figure 3:
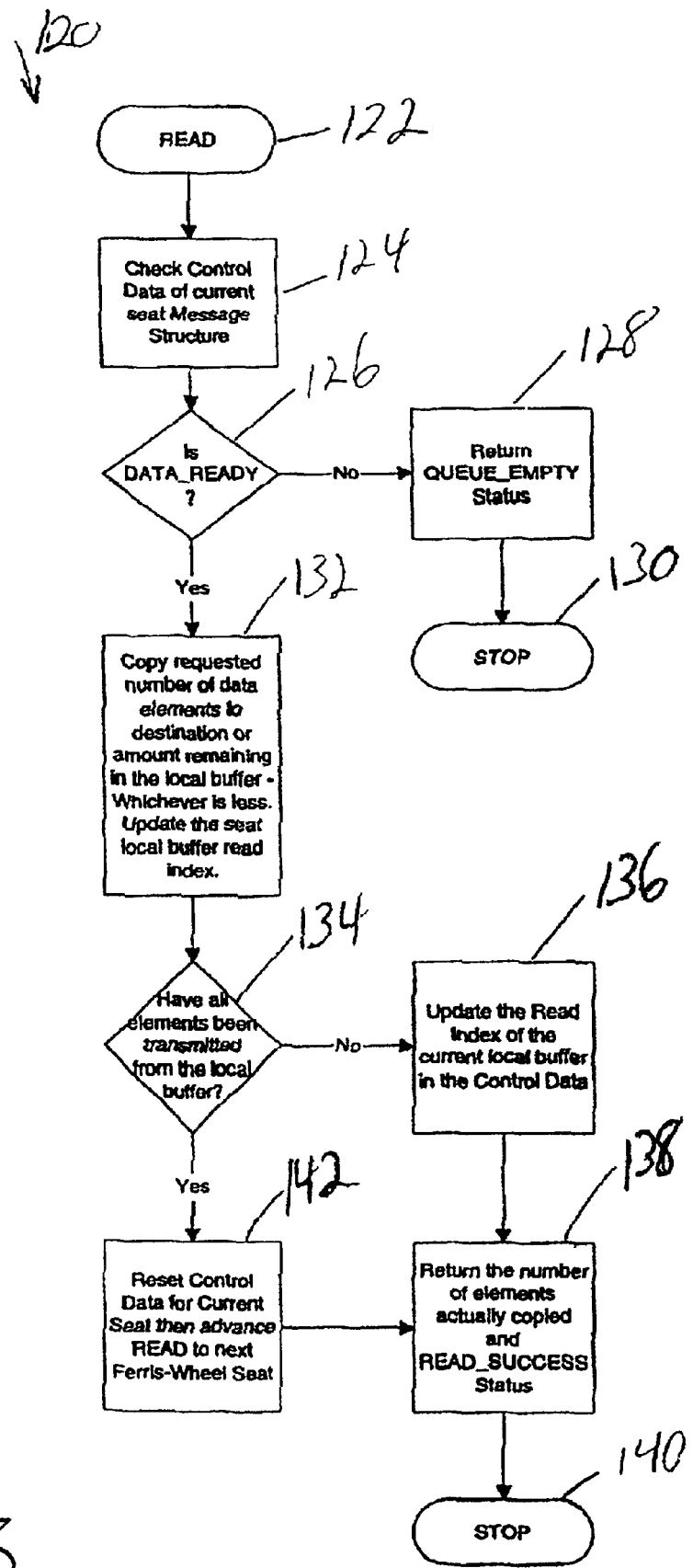
FIG. 3 is a flow chart depicting the method steps of the deque process of the preferred embodiment of the present invention shown in FIG. 1.

Generally referring to FIGS. 1, 2 and 3, a preferred embodiment of the present invention is disclosed. There are three major components of the "Ferris-Wheel Queue" and subcomponents processes. One subcomponent process is called enque, which is the process required to move data into the queue buffer space. Another subcomponent process is called deque, which is the process required to move data out of the queue buffer space. The "Ferris-Wheel Queue" buffer is the actual memory storage data structure used to store enque data.

The enque process is a set of functions which control putting data into the "Ferris-Wheel Queue". The enque process provides a set of sub-element functions called, write and gethandle. The write function is the main controlling function, and gethandle function controls the allocation of space in the queue to multiple processes.

The buffer is a heterogeneous two dimensional array constructed as a circular array of specific message structures. The first dimension of the array is a circular wheel. The wheel is the portion which contains the seats. The wheel has supporting software to support the implementation of a standard circular array. The seats are a collection of message structures which provide a data buffer for each seat, and a set of control variables which define the data status of the seat.

The deque is a set of functions which controls removing data from the "Ferris-wheel Queue". The deque function provides a read function and a senddata function.

The read function is the main controlling function which performs a Round Robin search in the first dimension of the buffer and maintains the associated control variables of each seat's message structure. The senddata function moves a specified amount of particular data to a designated location.

The enque and deque subcomponent processes are further described herein. Generally, the enque process (as shown in FIG. 2.) includes the steps of enquing data into the Ferris-Wheel buffer. First, the enque process determines the number of Ferris-Wheel seats required for the data to be enqued 74. Second, it requests the required number of seats. If the request is granted then the appropriate number of seat handles (indices into the buffer) will be allocated. Third, after the seats have been allocated, the enque process loads data into each of the seats. Fourth, after all data has been loaded into the seats, the process sets the seat control data. Fifth, the process provides a ready flag which indicates the message in the seat is ready to transmit. Further, the current index into the seat data buffer is set to zero.

Generally, the deque steps of dequing data from the Ferris-Wheel buffer include, first, conducting a simple round robin search of the Ferris-Wheel buffers checking the control data of each seat in sequence. If the seat is marked ready to transmit then the process may continue, otherwise it must be blocked, waiting for the next seat to become ready. Second, when a seat is ready the process will read the other control data to determine the number of seats belonging to this group of data, the total size data expected in each seat, and the current index into the seats buffer which is used to deque the data from the seat element by element. Third, the seat buffer is then dequed and then given to the requesting process. Fourth, the control data must be cleared. A ready flag which says the message in the seat is ready to transmit must be set to not-ready. The other flags and values are simply reset to an initial state.

More specifically, referring to FIG. 1, a flow chart 10 depicts the preferred embodiment, "Ferris-Wheel Queue" of the present invention. The "Ferris-Wheel Queue" supports an application layer 11 having a first process 12, a second process 14, and undetermined number of other processes "n" 16.

Next, the enque process 70 provides the application layer processes with a write function (further discussed below) for inserting data messages into the "Ferris-Wheel Queue" buffer 18. The buffer 18 includes a first priority buffer (priority 1) 20, and an undetermined number of other subsequent priority buffers (priority "n") 40. The first priority buffer 20 and the subsequent priority buffers 40 all include data boxes 22, 24, 26, 28, and 42, 44, 46, 48, respectively. The data boxes represent seats on the Ferris-Wheel buffer. The seat is a special structure which contains a local message buffer, and includes control variables. The seats are shown in the preferred embodiment in FIG. 1 as having number 1, 2, and 3, in boxes 22, 24, 26 and boxes 42, 44, and 46, respectively. The number in the box represents a handle assigned to that particular "Ferris-Wheel" seat which may be allocated to access the seat. Thus, seat 42 has a handle "one". The seats having an "n", 28 and 48, represent additional boxes as needed and as capabilities allow.

Next, the deque process 120 provides the application layer 49 processes 50, 52, 54 with a read function (further discussed below) for removing the data messages from the "Ferris-Wheel Queue" 10 buffer 18. The application layer 49 includes application layer processes 50, 52, and 54. Representing, respectively, a first process 50, a second process 52, and other processes "n" 54.

More specifically, referring to FIG. 2, a flow chart is shown depicting the enque process, which is more specifically disclosed below. The process starts with a write command 72 to determine the number of handles required for the data 74. The request of handles then requires the program to call to get handles 76. An IF statement is generated questioning whether the get handle succeeded 78. IF the answer is no the process returns a Write_Failure status 80 and the process is stopped 82. If the answer to the "get handle" question is yes, the program copies data into the allocated seats indexed by returned handles 84. Then, the process returns a Write_Success status 86. Finally, the process is stopped 88.

The get handle call 76 of FIG. 2a has a subroutine which is detailed as follows, and shown in FIG. 2b: The subroutine begins with the get handle command 90 and then proceeds to the IF box 92 to determine if there are sufficient handles available in the requested priority buffer. If sufficient handles are not available the program returns a Queue_Full status 94 and then the program stops 96. If the answer to the IF command is yes, that handles are available then the program allocates handles 98, and returns a success status to the IF command 78 of flow chart 2*a*. When this is complete, the program stops 100.

More specifically, referring to FIG. 3, the deque process 120 is disclosed more specifically below. The deque subprocess begins with a read command 122. The program proceeds to continue to check the control data of current seat message structure 124. An IF command asks if the data is ready (Data_Ready) 126. If the answer is no, the program returns a Queue_Empty status 128, and then stops the program 130. If the answer is yes, the program copies the requested number of data elements to the destination or the amount remaining in the local buffer, which ever is less, and updates the seat local buffer read index 132.

The next IF command 134 determines whether all elements have been transmitted from the local buffer. If the answer is no, the program updates the read index of the current local buffer and the control data 136. Next, the program returns the number of elements actually copied along with a Read_Success status 138. Then, the program stops 140. If the answer to the IF command 134 is yes, the program resets the control data for the current seat and advances to the next Ferris-Wheel seat 142. Next, the program returns the number of elements actually copies along with a Read_Success status 138. Then, the program stops 140.

The preferred embodiment of the apparatus, and its operation are further explained below. As previously discussed, there are three major components of the "Ferris-Wheel Queue". The major components are enque, which is the processes required to move data into the queue buffer space, deque, which is the process required to move data out of the queue buffer space and the buffer, which is the actual memory storage data structure used to store enqued data. The preferred embodiment which uses each of these major components is discussed in detail below.

The preferred method of enquing data into the Ferris-Wheel buffer is to provide a set of software components which will provide the capability of determining the availability of seats on the Ferris-Wheel and returning a set of one or more handles (indices) for the available seats. A mechanism is provided for controlling the transport of data into each available seat's buffer space, then setting the appropriate seat control information. The main write routine is responsible for controlling the enquing process. This routine may be implemented to control one or more "Ferris-Wheel Queue" buffers each having a different priority, and each being accessible by multiple processes. The write routine will need to be passed a pointer to the location of the data to be enqued, a priority, if handling multiple priority buffers, and the size of the data to enque. The write routine will return the status of the enquing operation, for example, "Success", "Queue Full", "Queue Busy",or "Failure". The write routine determines the number of seat handles required to enque the data by dividing the total data size by the size of each seat's buffer. The write routine then calls the gethandle routine. This routine may return the required available handles or an error status. If no error exists, the write function will call a routine which is designed to copy the data from the source location into the appropriate seat buffers. After the successful loading of the data onto the seats, the write must set the control data in each seat. Once set, a "Success" status is returned by the write routine.

The gethandle routine is implemented to manage handles for one or more prioritized "Ferris-Wheel Queue" buffers. The gethandle routine will only return the handles if sufficient handles are available to meet the request. If a handle is available, the gethandle routine will then return a "Success" status, otherwise it will return a "Queue Full" status. The gethandle routine is the specific control function which maintains the available seat handles and appropriately allocates the handles to each calling process. This routine is the mechanism which allows multiple processes operating at various tasks rates to use a single communications buffer without causing garbled and intermingled data. This routine is the "Ferris-Wheel Queue's" critical section, and must therefore be protected against reentrance issues.

The preferred embodiment of the Ferris-Wheel buffer is characterized as a circular array of message structures. The message structures are a set of control variables, such as, "Message Ready", "Message Size", "Last Handle", "Read Index"; and "Message Buffer". The first dimension of this heterogeneous two dimensional array is the circular portion which makes up the wheel of the Ferris-Wheel. On this wheel are located the seats (Message Structures) in the second dimension. The buffer may be sized in either/both dimensions in order to achieve optimal memory usage determined by the patterns of data being enqued. This design may include arrays which are statically sized and bound at compile time, or dynamically allocated/sized, which may be sizable arrays at run time. Each seat (message structure) on the Ferris-Wheel is enumerated by a handle (array index in the first dimension).

The preferred method of dequing data from the Ferris-Wheel buffer is to provide a set of software components which will provide the capability of controlling the reading of the enqued data and return that data to a lower level transport layer or hardware layer driver. The main controlling routine is a read function. The read function, when called by a process desiring enqued data, will check the Ferris-Wheel, in a round robin search method, for a seat (message structure) which is marked as ready to transmit. This process will block when it reaches a seat which is not marked ready. Upon determining that a seat is ready to be dequed, the read will check all of the Message Structure control variables and send data out. The read will deque the entire message up to the number of elements requested, that is the smaller of the requested size or the message size. The read index in the Message Structure's control variables tells the read function the index of the next element in the Message buffer to send. After all of the elements of a seat have been dequed, then the control variables are cleared and the seat is marked available again.

Figure 4:
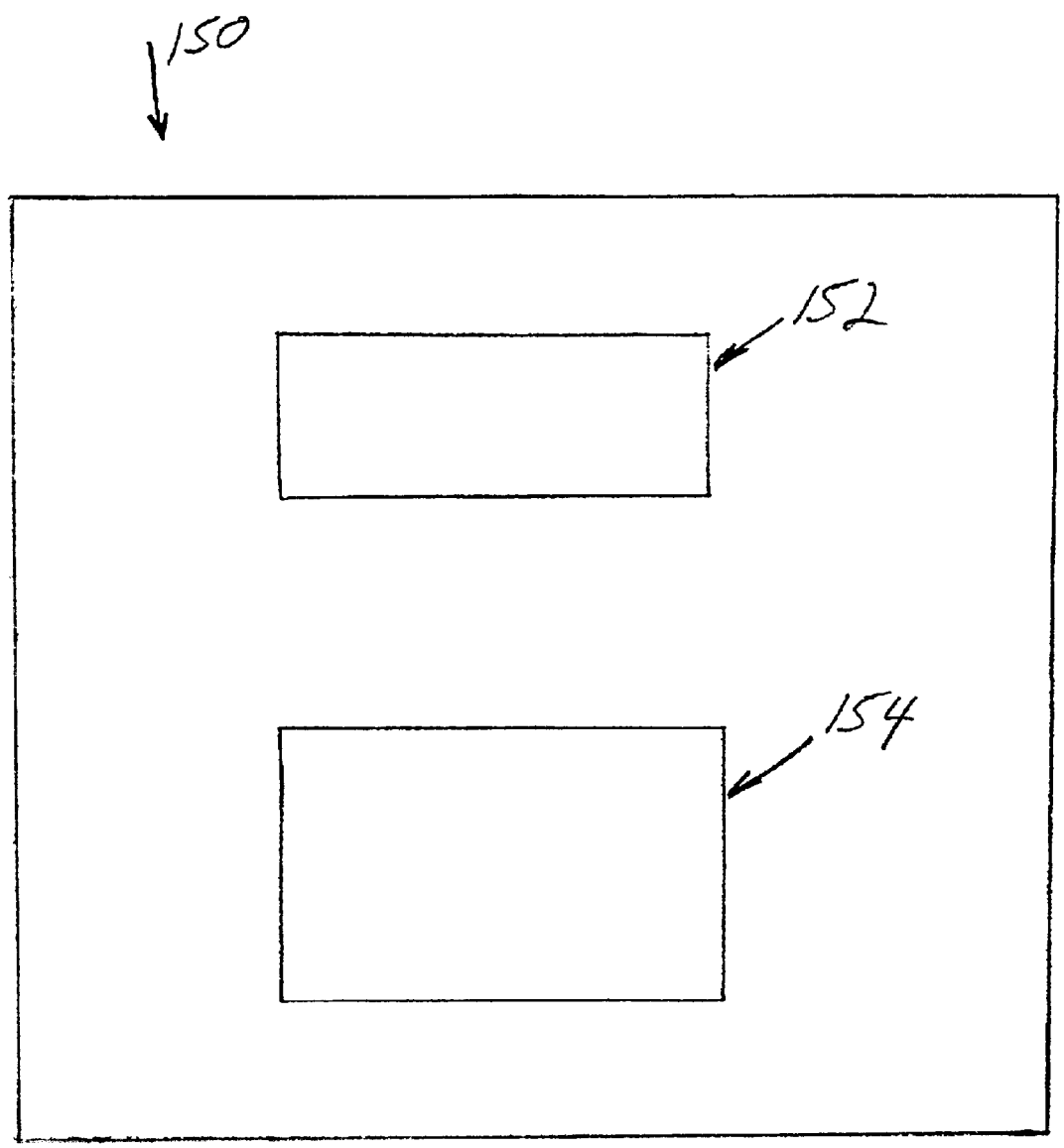
FIG. 4 is a schematic of a computer for running a computer program embodying the method of the present invention.

The method of the present invention may be embodied as a computer program product stored on a program storage device. This program storage device may be devised, made and used as a component of a machine utilizing optics, magnetic properties and/or electronics to perform the method steps of the present invention. Program storage devices include, but are not limited to, magnetic disks or diskettes, magnetic tapes, optical disks, Read Only Memory (ROM), floppy disks, semiconductor chips and the like. A computer readable program code means in known source code may be employed to convert the methods described below for use on a computer. The computer program or software incorporating the process steps and instructions described further below may be stored in any conventional computer, for example, that shown in FIG. 4. The computer 150 incorporates a program storage device 152 and a microprocessor 154. Installed on the program storage device 152 is the program code incorporating the method of the present invention, as well as any database information for the "Ferris-Wheel Queue" data structure.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of transferring incoming multithreaded concurrent sets of data from a sending transport system to a requesting transport system comprising the steps of:
   retrieving said sets of data, querying a ferns-wheel receiving queue for available data storage locations, and transferring said sets of data to said ferris-wheel receiving queue;
   queuing said sets of data in said ferris-wheel receiving queue by dividing said sets of data into blocks of data, storing said blocks of data in said available data storage locations, having associated data by using location indexes to associate said blocks of data with said corresponding storage location;
   marking a message structure ready to transmit including:
      determining a number of ferris-wheel seats required for a set of data to be enqueued;
      requesting said required number of seats;
      allocating an appropriate number of indices into a buffer;
      loading said set of data into said seats;
      setting control data for said seats;
      setting a ready flag to indicate said set of data is ready to be transmit;
   performing a round robin search on said ferris-wheel receiving queue for said message structure marked as ready to transmit; and
   sending said sets of data located by said round robin search and marked ready to transmit, by transmitting said associated data in said storage locations to said requesting transport system, and indicating said storage location is available for storing other said blocks of data.

2. The method of claim 1 wherein said transmitting said data is a point to point transmission.

3. The method of claim 1 wherein said data is transmitted synchronously.

4. The method of claim 1 wherein said data is transmitted asynchronously.

5. A method of transferring incoming multithreaded concurrent sets of data from a sending transport system to a requesting transport system comprising the steps of:
   retrieving said sets of data from said sending transport system, a ferris-wheel receiving queue being queried for a number of available data storage locations, and said sets of data being transferred to said ferris-wheel receiving queue;
   queuing said sets of data in said ferris-wheel receiving queue, each said set of data being divided into blocks of data, determining a number of said data storage locations for storing said blocks of data, said blocks of data being loaded into available said data storage locations, providing location indexes for each of said blocks of data where said location indexes associate said block of data with a corresponding said storage location;
   marking a message structure ready to transmit including:
      determining a number of ferris-wheel seats required for a set of data to be enqueued;
      requesting said required number of seats;
      allocating an appropriate number of indices into a buffer;
      loading said set of data into said seats;
      setting control data for said seats;
      setting a ready flat to indicate said set of data is ready to be transmit;
   performing a round robin search on said ferris-wheel receiving queue for a message structure marked as ready to transmit;
   sending said sets of data located by said round robin search and marked ready to transmit to said requesting transport system by transmitting associated data in said storage locations, and indicating said storage location is available for storing other said blocks of data.

6. The method of claim 5 wherein said data being transmitted is sent as a single message.

7. The method of claim 5 wherein said data is being transmitted as a point to point transmission.

8. The method of claim 5 wherein said data is transmitted synchronously.

9. The method of claim 5 wherein said data is transmitted asynchronously.

10. The method of claim 5 further comprising the steps of:
    calculating a required number of said data storage locations for said sets of data.

11. The method of claim 10 further comprising the steps of:
    determining if said ferris-wheel receiving queue has available said required number of said data storage locations; and
    signaling said retrieving process to transfer said sets of data to said ferris-wheel receiving queue.

12. The method of claim 5 further including indicating to said requesting transport system that said sets of data are ready for sending.

13. A method of transferring incoming multithreaded concurrent sets of data in a point-to-point either synchronous or asynchronous transmission from a sending transport system to a requesting transport system comprising the steps of:
    providing a circular array structured retrieving process for retrieving said sets of data from said sending transport system and retrieving said sets of data from said sending transport system;
    calculating a required number of said data storage locations for said sets of data;
    a ferris-wheel receiving queue being queried for a number of available data storage locations,
    determining if said ferris-wheel receiving queue has available said required number of data storage locations;
    signaling said circular array structured retrieving process to transfer said sets of data to said ferris-wheel receiving queue;
    said sets of data being transferred to said ferris-wheel receiving queue;
    queuing said sets of data in said ferris-wheel receiving queue, each said set of data being divided into blocks of data, determining a number of said data storage locations for storing said blocks of data, said blocks of data being loaded into said available data storage locations, providing location indexes for each of said blocks of data where said location indexes associate said block of data with a corresponding said storage location, providing a sending process for sending said sets of data to said requesting transport system indicating to said requesting transport system that said sets of data are ready for sending;

marking a message structure ready to transmit including:
determining a number of ferris-wheel seats required for a set of data to be enqueued;
requesting said required number of seats;
allocating an appropriate number of indices into a buffer;
loading said set of data into said seats;
setting control data for said seats;
setting a ready flag to indicate said set of data is ready to be transmit;

performing a round robin search on said ferris-wheel receiving queue for a message structure marked as ready to transmit;

transmitting associated data in said storage locations as a result of said round robin search, wherein said data being transmitted is sent as a single message; and indicating said storage location is available for storing new said blocks of data.

14. A computer program product for transferring incoming multithreaded concurrent sets of data from a sending transport system to a requesting transport system, said computer program product having:

computer readable program code means for retrieving said sets of data, querying a ferris-wheel receiving queue for available data storage locations, and transferring said sets of data to said ferris-wheel receiving queue;

computer readable program code means for queuing said sets of data in said ferris-wheel receiving queue by dividing said sets of data into blocks of data, storing said blocks of data in said available data storage locations, having associated data by using location indexes to associate said blocks of data with said corresponding storage location;

marking a message structure ready to transmit including:
determining a number of ferris-wheel seats required for a set of data to be enqueued;
requesting said required number of seats;
allocating an appropriate number of indices into a buffer;
loading said set of data into said seats;
setting control data for said seats;
setting a ready flag to indicate said set of data is ready to be transmit;

performing a round robin search on said ferris-wheel receiving queue for a message structure marked as ready to transmit; and computer readable program code means for sending said sets of data located by said round robin search and marked ready to transmit, by transmitting said associated data in said storage locations to said requesting transport system, and indicating said storage location is available for storing other said blocks of data.

15. A program storage device readable by a machine, tangibly embodying a program of instructions executable by the machine to perform method steps for transferring incoming multithreaded concurrent sets of data from a sending transport system to a requesting transport system, said method steps comprising:

retrieving said sets of data, querying a ferris-wheel receiving queue for available data storage locations, and transferring said sets of data to said ferris-wheel receiving queue;

queuing said sets of data in said ferris-wheel receiving queue by dividing said sets of data into blocks of data, storing said blocks of data in said available data storage locations, having associated data by using location indexes to associate said blocks of data with said corresponding storage location;

marking a message structure ready to transmit including:
determining a number of ferris-wheel seats required for a set of data to be enqueued;
requesting said required number of seats;
allocating an appropriate number of indices into a buffer;
loading said set of data into said seats;
setting control data for said seats;
setting a ready flag to indicate said set of data is ready to be transmit;

performing a round robin search on said ferris-wheel receiving queue for a message structure marked as ready to transmit; and sending said sets of data located by said round robin search, and marked ready to transmit, by transmitting said associated data in said storage locations to said requesting transport system, and indicating said storage location is available for storing other said blocks of data.

16. The method of claim 1 wherein said ferris-wheel receiving queue comprises a heterogeneous two-dimensional array constructed as a circular array of specific message structures.

17. The method of claim 16 further comprising performing said round-robin search in the first dimension of said array and maintaining associated control variables for each message structure.

18. The method of claim 16 wherein a first dimension of said two-dimensional array includes a software generated circular wheel buffer.

19. The method of claim 18 further comprising performing said round-robin search in the first dimension of said array and maintaining associated control variables for each message structure.

20. The method of claim 5 wherein said ferris-wheel receiving queue comprises a heterogeneous two-dimensional array constructed as a circular array of specific message structures.

* * * * *